US008885849B2

(12) United States Patent
Arias-Drake et al.

(10) Patent No.: US 8,885,849 B2
(45) Date of Patent: Nov. 11, 2014

(54) COMPONENT HAVING A MICROMECHANICAL MICROPHONE STRUCTURE, AND METHOD FOR OPERATING SUCH A MICROPHONE COMPONENT

(75) Inventors: Alberto Arias-Drake, Seville (ES); Thomas Buck, Pittsburgh, PA (US); Jochen Zoellin, Stuttgart (DE); Juan Ramos-Martos, Seville (ES); Franz Laermer, Stadt (DE); Antonio Ragel-Morales, Seville (ES); Joaquin Ceballos-Caceres, Seville (ES); Jose M. Mora-Gutierrez, Seville (ES)

(73) Assignee: Robert Bosch GmbH, Stuttgart (DE)

( * ) Notice: Subject to any disclaimer, the term of this patent is extended or adjusted under 35 U.S.C. 154(b) by 555 days.

(21) Appl. No.: 13/138,276

(22) PCT Filed: Jan. 11, 2010

(86) PCT No.: PCT/EP2010/050208
§ 371 (c)(1),
(2), (4) Date: Nov. 21, 2011

(87) PCT Pub. No.: WO2010/086206
PCT Pub. Date: Aug. 5, 2010

(65) Prior Publication Data

US 2012/0057721 A1 Mar. 8, 2012

(30) Foreign Application Priority Data

Feb. 2, 2009 (DE) ......................... 10 2009 000 535
Feb. 18, 2009 (DE) ......................... 10 2009 000 950

(51) Int. Cl.
*H04B 15/00* (2006.01)
*H04R 19/01* (2006.01)
*H04R 3/00* (2006.01)

(52) U.S. Cl.
CPC .............. *H04R 3/007* (2013.01); *H04R 19/016* (2013.01)
USPC ......................................... 381/94.2; 381/94.7

(58) Field of Classification Search
USPC ............................ 381/94.2, 113, 83, 93, 94.7
See application file for complete search history.

(56) References Cited

U.S. PATENT DOCUMENTS

2006/0008097 A1 * 1/2006 Stenberg et al. .............. 381/113
2007/0160234 A1 * 7/2007 Deruginsky et al. .......... 381/113

FOREIGN PATENT DOCUMENTS

JP 2006-229336 8/2006
JP 2007-171203 7/2007
WO WO 02/03747 1/2002

*Primary Examiner* — Duc Nguyen
*Assistant Examiner* — Phan Le
(74) *Attorney, Agent, or Firm* — Kenyon & Kenyon LLP

(57) ABSTRACT

A concept is proposed for a MEMS microphone which may be operated at a relatively low voltage level and still have comparatively high sensitivity. The component according to the present invention includes a micromechanical microphone structure having an acoustically active diaphragm which functions as a deflectable electrode of a microphone capacitor (1), and a stationary acoustically permeable counterelement which functions as a counter electrode of the microphone capacitor (1). The component also includes means for applying a high-frequency clock signal (2) to the microphone capacitor (1) and for applying the inverted clock signal (2') to an adjustable but acoustically inactive compensation capacitor (7), an integrating operational amplifier (3) which integrates the sum of the current flow through the microphone capacitor (1) and the current flow through the compensation capacitor (7), a demodulator (4) for the output signal of the integrating operational amplifier (3), the demodulator being synchronized with the clock signal (2), and a low-pass filter for obtaining a microphone signal which corresponds to the changes in capacitance of the microphone capacitor (1), based on the output signal of the demodulator (4).

15 Claims, 4 Drawing Sheets

COMPONENT HAVING A MICROMECHANICAL MICROPHONE STRUCTURE, AND METHOD FOR OPERATING SUCH A MICROPHONE COMPONENT

BACKGROUND OF THE INVENTION

1. Field of the Invention

The present invention relates to a component having a micromechanical microphone structure. The micromechanical microphone structure includes at least one acoustically active diaphragm which functions as a deflectable electrode of a microphone capacitor, a stationary acoustically permeable counterelement which functions as a counter electrode of the microphone capacitor, and means for detecting and evaluating the changes in capacitance of the microphone capacitor.

Moreover, the present invention relates to a method for operating such a microphone component.

2. Description of Related Art

Capacitive microelectromechanical system (MEMS) microphones are becoming increasingly important in various fields of application. This is essentially due to the miniaturized design of such components and the possibility for integrating additional functionalities at very low manufacturing costs. The integration of signal processing components such as filters and components for noise suppression, as well as components for generating a digital microphone signal, is particularly advantageous. Another advantage of MEMS microphones is their high temperature stability.

The diaphragm of the microphone structure is deflected by acoustic pressure. This causes the distance between the diaphragm and the counter electrode to change, resulting in a change in capacitance of the microphone capacitor. These very small changes in capacitance in the AF range must be converted into a usable electrical signal.

One concept frequently implemented in practice is based on charging the microphone capacitor with a direct-current voltage via a high-impedance charging resistor. Changes in capacitance of the microphone capacitor are then detected as fluctuations in the output voltage, which is amplified via an impedance converter. This may be a JFET, for example, which converts the high impedance of the microphone in the range of Gohm into a relatively low output impedance in the range of several 100 ohms without altering the output voltage itself. Instead of a JFET, an operational amplifier circuit may be used which supplies a low output impedance. In contrast to the JFET, in this case the amplifying factor may be adapted to the particular microphone requirements.

The known concept has proven to be problematic in several respects:

The digital circuit elements together with the analog signal processing components are not easily implemented in CMOS technology due to the occurrence of electrical noise. The JFET technology, which requires low noise, cannot be achieved within the scope of standard CMOS processes.

Electrostatic forces of attraction are present between the diaphragm and the counter electrode due to the direct-current voltage applied to the microphone capacitor during operation of the microphone. These electrostatic forces are critical in particular in overload situations, since they promote continuous adherence of the diaphragm to the counter electrode, resulting in a breakdown of the microphone function. To detach the diaphragm from the counter electrode, it is generally necessary to completely discharge the microphone capacitor. In practice, mechanical measures such as a relatively stiff diaphragm suspension, a relatively large distance between the diaphragm and the counter electrode, or mechanical stops, for example, have been attempted in order to avoid such electrostatic collapse. However, these measures usually have an adverse effect on the sensitivity of the microphone, or are very complicated from the point of view of the manufacturing process.

Lastly, it is noted that a relatively high direct-current voltage in the range of 10 volts and greater must be applied to the microphone capacitor to achieve a sufficiently high signal-to-noise ratio (SNR). However, a charging voltage in this range requires a comparatively large distance between the diaphragm and the counter electrode in the range of >>2 μm, on the one hand to avoid electrostatic collapse, and on the other hand to provide a sufficiently large deflection range for the diaphragm. Such large distances are not easily provided using standard surface micromechanical methods. In addition, such high charging voltages in overload situations result not only in adherence of the diaphragm to the counter electrode, but also irreversible melting of the contact surfaces. In practice, attempts have been made to prevent this with the aid of insulating layers. However, these increase the complexity of the manufacturing process, and therefore ultimately increase the costs for such a microphone component.

BRIEF SUMMARY OF THE INVENTION

The present invention proposes a concept for a MEMS microphone which may be operated at a relatively low voltage level while still having comparatively high sensitivity. In addition, such a MEMS microphone may be manufactured in a very cost-effective manner.

The concept according to the present invention provides that a high-frequency clock signal is applied to the microphone capacitor, and the inverted clock signal is applied to an adjustable but acoustically inactive compensation capacitor. The sum of the current flow through the microphone capacitor and the current flow through the compensation capacitor is integrated with the aid of an integrating operational amplifier. The output signal of the integrating operational amplifier is then demodulated with the aid of a demodulator which is synchronized with the clock signal. Lastly, a microphone signal which corresponds to the changes in capacitance of the microphone capacitor is obtained by low-pass filtering of the demodulated signal.

Accordingly, the microphone component according to the present invention includes means for applying a high-frequency clock signal to the microphone capacitor and for applying the inverted clock signal to an adjustable but acoustically inactive compensation capacitor, in addition to an integrating operational amplifier which integrates the sum of the current flow through the microphone capacitor and the current flow through the compensation capacitor, a demodulator for the output signal of the integrating operational amplifier, the demodulator being synchronized with the clock signal, and a low-pass filter for obtaining a microphone signal which corresponds to the changes in capacitance of the microphone capacitor, based on the output signal of the demodulator.

The adjustable compensation capacitor is used for compensating for the direct current component which flows through the microphone capacitor and which is due not to acoustic effects, but rather is manufacturing-related or, for example, occurs due to drift behavior of the microphone capacitor. Ideally, the compensation capacitor is adjusted corresponding to the quiescent capacitance of the microphone capacitor. Since the inverted clock signal is present at the compensation capacitor while the microphone capacitor is supplied with the clock signal, the operational amplifier integrates only the component of the current flow through the microphone capacitor which is due to the acoustically related changes in capacitance of the microphone capacitor. Based on the output signal of the integrating operational amplifier, a microphone signal which reflects these changes in capacitance may then be obtained relatively easily, namely by synchronized demodulation and low-pass filtering.

At a voltage level of the high-frequency clock signal of less than 2 volts, the type of signal detection according to the present invention provides acceptable sensitivity, i.e., a sufficiently high SNR. This is also advantageous in particular in overload situations. Namely, for voltages in this range, contact between the diaphragm and the counter electrode does not result in melting of the contact surfaces, and therefore also does not result in destruction of the microphone structure. For this reason, within the scope of the concept according to the present invention, mechanical overload protection in the form of electrically insulating stops may be dispensed with.

The micromechanical structure of the component according to the present invention as well as the circuitry components thereof for signal detection may be produced using standard processes of CMOS technology, and therefore in a very cost-effective manner.

In one particularly advantageous specific embodiment of the present invention, the compensation capacitor is automatically adapted to the quiescent capacitance of the microphone capacitor. This regulation is based on the direct-current voltage component of the demodulator output signal, since this direct-current voltage component corresponds to the asymmetry between the microphone capacitor and the compensation capacitor. The direct-current voltage component may be ascertained very easily with the aid of an offset filter provided downstream from the demodulator. To ensure that only the direct-current voltage component is actually filtered out, the upper limiting frequency of this offset filter should be considerably less than the lower limiting frequency of the microphone. The compensation capacitor is then easily adjusted in such a way that the direct-current voltage component of the demodulator output signal is minimized.

For this purpose, the adjustable compensation capacitor may be implemented in the form of a switchable capacitor bank, for example. This switchable capacitor bank may include a binary distribution of capacitance values and/or a series of identical capacitance values which are optionally interconnected. Instead of varying the compensation capacitor, the alternating voltage amplitude of the inverted clock signal at the compensation capacitor may also be adjusted via a resistor series or a voltage divider. Varying the voltage level by changing the current through the compensation capacitor has an effect equivalent to a change in the capacitor value. Since the connection of very small capacitance values in the range of a femtofarad may be difficult to control, a combination of both methods is very advantageous. The rough adjustment is made using switched capacitors, and the fine adjustment is made by slightly varying the voltage level.

The compensation capacitor is advantageously adjusted in steps in order to take the dynamics of the system into account. Depending on the type of capacitor bank and/or resistor series used, various approximation strategies may be applied. For a capacitor bank or resistor bank having a series of identical capacitance or impedance values, respectively, a linear approximation is recommended. A binary search algorithm may be implemented more easily using a capacitor bank whose capacitance values have a binary distribution.

It is reasonable to initialize the compensation capacitor together with the microphone component. In this case, the compensation capacitor is thus automatically adapted before the actual operation of the microphone, during the initialization or during the compensation of the microphone component.

In one particularly advantageous refinement of the present invention, however, the direct-current voltage offset of the output signal of the demodulator is detected not during this initialization phase, but, rather, during the actual operation of the microphone in order to monitor the functionality of the microphone and to carry out early recognition of overload situations, in particular an electrostatic collapse of the electrodes of the microphone capacitor, and to take appropriate countermeasures.

If physical contact occurs between the movable diaphragm and the stationary counter electrode in an overload situation, the microphone capacitor is electrically short-circuited. At this moment the direct-current voltage component increases very rapidly and very intensely before the microphone function completely breaks down, since the diaphragm generally remains adhered to the counter electrode due to the electrostatic conditions. In one advantageous specific embodiment of the present invention, such an overload situation is detected based on the peak-like curve of the direct-current voltage offset signal. For this purpose, the direct-current voltage component is periodically compared to a predefined maximum limiting value. If the direct-current voltage component exceeds this maximum limiting value, an electrical reset is automatically carried out in which the microphone capacitor is discharged in order to detach the diaphragm from the counter electrode and restore the microphone function. Thus, in this variant of the present invention a type of overload protection for the microphone component is achieved solely by circuitry. In this case corresponding mechanical measures may be dispensed with, which overall greatly simplifies the manufacturing process for the component according to the present invention.

The monitoring of the direct-current voltage component may also be used to readjust the setting of the compensation capacitor during operation of the microphone, for example to counteract long-term drift phenomena. For this purpose, in one advantageous refinement of the present invention, the compensation capacitor is also automatically adjusted during operation of the microphone, in particular whenever the direct-current voltage offset departs from a tolerance band which is specified by a further limiting value. This second limiting value is selected to be much smaller than the maximum limiting value which indicates the electrostatic collapse. This is explained in greater detail below with reference to one exemplary embodiment of the present invention.

In one particularly advantageous refinement of the present invention, the direct-current voltage component of the demodulated signal is used not only for adapting the compensation capacitor and/or for monitoring the microphone function, but also for detecting accelerations which act on the microphone component. Use is made of the fact that basically any capacitive microphone structure is also sensitive to accelerations such as the acceleration due to gravity, for example. If an acceleration acts perpendicularly to the microphone diaphragm, the microphone diaphragm is deflected due to its mass and flexible suspension, resulting in a corresponding change in capacitance. These are generally static, or at least very low-frequency, changes in capacitance which are reflected in the signal curve of the direct-current voltage component. Thus, when the signal curve of the direct-current voltage component is appropriately evaluated, the concept according to the present invention allows the detection of accelerations acting perpendicularly to the microphone diaphragm without the need for an additional sensor element.

Thus, using this concept, it is possible not only to implement a very inexpensive microphone having comparatively high sensitivity and robustness, but also to detect motions or merely only changes in position of the built-in device, without additional sensor elements. The component according to the present invention could be used, for example, within the scope of a telephone or PDA in order to recognize whether the device is moved or is resting on a table, and then to automatically switch between a vibrating alarm and a ring. For a telephone application, individual control actions such as, for example, switching a keylock on or off or accepting or refusing an incoming call, could be initiated via simple gestures, for example by rotating the device about a certain axis.

As previously mentioned, the acceleration information is ascertained from the direct-current voltage component of the demodulated signal. This direct-current voltage component may be obtained by appropriate low-pass filtering of the output signal of the demodulator, or may also be separated from the microphone signal with the aid of a simple low-pass filter, while an optional high-pass filter simulates the behavior of classical microphones at the output. Such a high-pass filter is optional, since a high-pass filter for capacitive decoupling is present anyway in typical circuits for microphones. A suitable low-pass filter may be technically implemented at various locations. For example, the low-pass filter may be integrated into the ASIC, so that the acceleration may be picked up via an additional pin. Another option is to implement the low-pass filter on the motherboard in the form of discrete components. The low-pass filter may also be integrated into the signal processing switching circuit, for example in the chipset of a mobile telephone. Lastly, for a digital microphone signal the low-pass filter may also be implemented strictly as software, which is particularly appealing, since in this case no additional components or circuit changes are necessary.

BRIEF DESCRIPTION OF THE DRAWINGS

As previously stated, there are various options for advantageously embodying and refining the teaching of the present invention. For this purpose, reference is made on the one hand to the patent claims subordinate to the independent patent claims, and on the other hand to the following description of one exemplary embodiment of the present invention with reference to the figures.

DETAILED DESCRIPTION OF THE INVENTION

Figure 1:
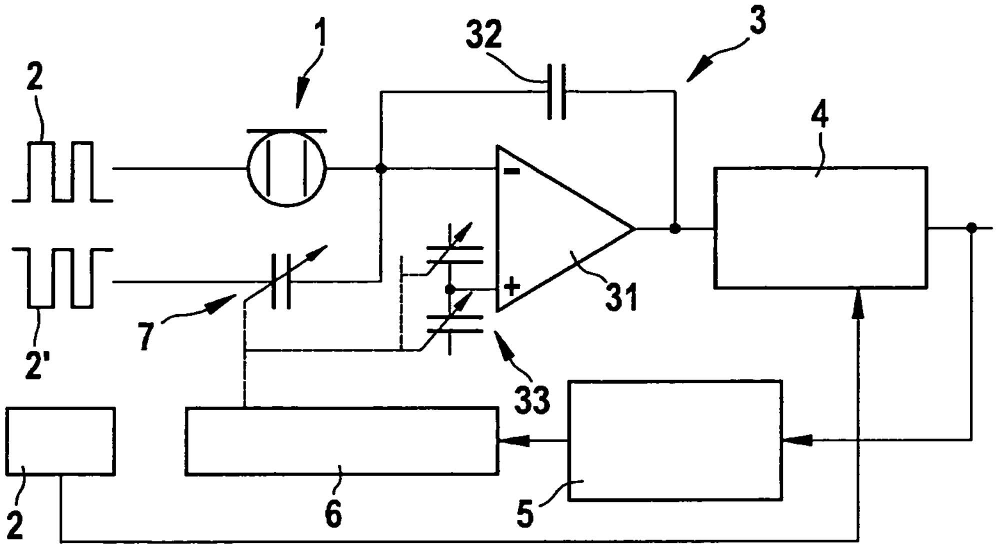
FIG. 1 shows a schematic wiring diagram of a component according to the present invention.

A primary part of the component according to the present invention is a micromechanical microphone structure which includes an acoustically active diaphragm and a stationary acoustically permeable counterelement. The diaphragm and the counterelement form the deflectable electrode and the stationary electrode, respectively, of a microphone capacitor, which is denoted by reference numeral 1 in FIG. 1. As the result of an acoustic effect, the distance between the diaphragm and the counter electrode, and therefore also the capacitance of microphone capacitor 1, changes. Microphone capacitor 1 is acted on by a high-frequency clock signal 2 in order to detect these changes in capacitance. The resulting current flow through microphone capacitor 1 is supplied to the negative input of a charge amplifier 31.

In addition to acoustically active microphone capacitor 1, the component according to the present invention includes an acoustically inactive adjustable compensation capacitor 7. The acoustically inactive adjustable compensation capacitor is designed to compensate for the current which flows through microphone capacitor 1 when the latter is acted on by the high-frequency clock signal. For this purpose, adjustable compensation capacitor 7 is supplied with inverted clock signal 2'. The resulting current flow through compensation capacitor 7 is likewise supplied to the negative input of charge amplifier 31.

Since the output of charge amplifier 31 is fed back to the negative input via a capacitor 32, operational amplifier 31 together with capacitor 32 forms an integrating charge amplifier 3 which integrates the sum of the current flows through the two capacitors 1 and 7.

Ideally, compensation capacitor 7 is adjusted in such a way that its capacitance corresponds to the quiescent capacitance of microphone capacitor 1. In the present case, the two current flows largely cancel out one another except for the deviations due to the acoustically related fluctuations in capacitance of microphone capacitor 1. Only these deviations are subsequently integrated with the aid of integrating operational amplifier 3.

In order to obtain a microphone signal from the output signal of integrating operational amplifier 3 which reflects the acoustically related fluctuations in capacitance of microphone capacitor 1, this output signal is supplied to a demodulator 4 which is synchronized with clock signal 2. An analog microphone signal may then be obtained from the demodulated signal via suitable low-pass filtering. A digital microphone signal may alternatively be obtained by additional use of a sigma-delta conversion, for example.

In the exemplary embodiment described here, compensation capacitor 7 is automatically adjusted, specifically during the initialization or compensation phase of the microphone component. For this purpose, the output signal of demodulator 4 is supplied to a low-pass filter 5 whose upper limiting frequency is designed to be considerably less than the lower limiting frequency of the microphone. With the aid of this low-pass filter 5 the direct-current voltage component of the demodulated signal is ascertained, and thus the asymmetry between microphone capacitor 1 and compensation capacitor 7 is ultimately ascertained. Compensation capacitor 7 is then automatically modified with the aid of a regulating stage 6 in such a way that the direct-current voltage component is minimized.

At this point it is noted that the direct-current voltage offset signal does not necessarily have to be obtained directly from the output signal of demodulator 4, and instead may be obtained from the output signal of a subsequent processing step, provided that the direct-current voltage component has not yet been filtered out.

In the exemplary embodiment illustrated here, a reference capacitor system 33 is provided upstream from the reference input of charge amplifier 31, the reference capacitor system likewise being regulated with the aid of regulating stage 6, i.e., on the basis of the monitored direct-current voltage offset signal, in order to achieve optimum noise and interference signal suppression with respect to the supply voltage.

Figure 2:
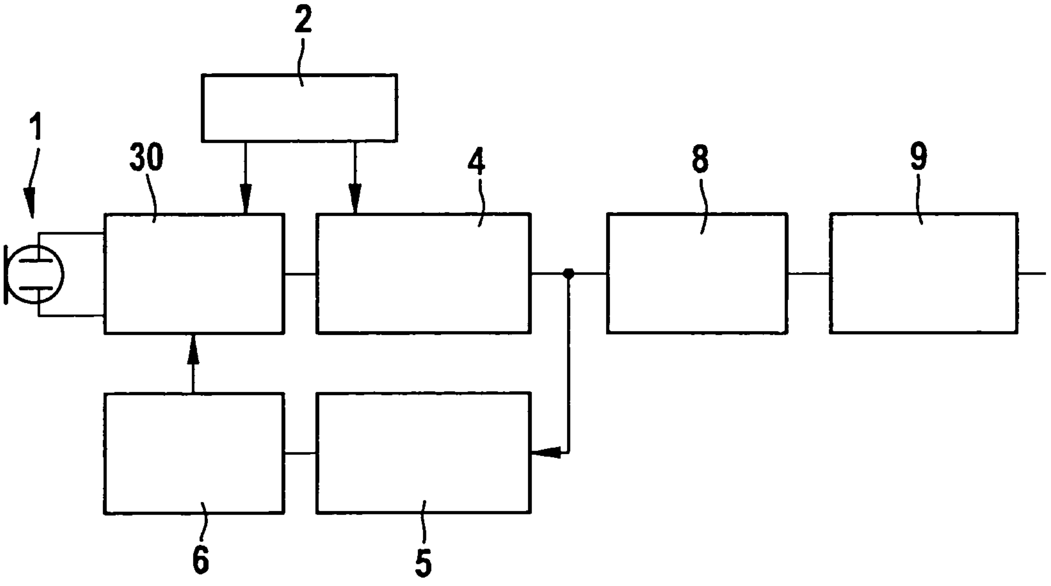
FIG. 2 shows a block wiring diagram of the functionality of a component according to the present invention.

The block wiring diagram of FIG. 2 illustrates once more the functionality and the interaction of the individual parts of a component according to the present invention, in the present case only microphone capacitor 1, which receives the acoustic signal and converts same into an electrical signal, being shown separately. In the present case the adjustable but acoustically inactive compensation capacitor is part of amplifier component 30, and therefore is not illustrated separately. High-frequency clock signal 2 is applied to the microphone capacitor, and also in inverted form to the compensation capacitor at amplifier component 30. Clock signal 2 is also used for synchronizing demodulator 4 situated downstream from amplifier component 30. In the variant illustrated in FIG. 2, the demodulated signal is first supplied to an amplifier 8. Low-pass filtering and an optional sigma-delta conversion are then carried out in a further processing step 9 in order to obtain a digital microphone signal, which reflects the acoustically related changes in capacitance of microphone capacitor 1, from the demodulated signal.

Similarly as in FIG. 1, the output signal of demodulator 4 is also supplied to a low-pass filter component 5 in order to ascertain the direct-current voltage component of the demodulated signal and form the basis for adapting the compensation capacitor. This regulation is carried out in regulating stage 6.

The adaptation and regulation of the compensation capacitor as well as the monitoring of the microphone function of a component according to the present invention are explained below in conjunction with the variation over time of direct-current voltage offset signal UOffset, illustrated in FIG. 3.

In the exemplary embodiment described here, the compensation capacitor of the component according to the present invention is adjusted a first time during the initialization of the component. This is carried out in steps, the quiescent capacitance of the microphone capacitor being linearly approximated. For this purpose, the direct-current voltage component of the output signal of the demodulator is continuously or at least periodically monitored, and is successively minimized by appropriately changing the capacitance of the compensation capacitor. This procedure results in the stepped signal curve up to point in time t1. At point in time t1 the initialization phase of the microphone component and also the initial adjustment of the compensation capacitor are terminated.

Beginning at point in time t1, the direct-current voltage component is used for monitoring the microphone function of the component. As long as the direct-current voltage component varies around the zero line within a tolerance band specified by limiting value UT, such as in the time period between t1 and t2, the microphone function meets the intended quality criteria. In the exemplary embodiment described here, the tolerance band covers approximately 10% of the voltage range of the demodulated signal. Of course, the position and width of this tolerance band may be selected differently, provided that the microphone and circuit characteristics are primarily taken into account.

At point in time t2 the direct-current voltage offset signal drifts out of the tolerance band due to the fact that the direct-current voltage offset is less than lower limiting value UT. This triggers an automatic readjustment of the compensation capacitor. The capacitance of the compensation capacitor is now changed in such a way that the direct-current voltage offset once again varies within the predefined tolerance band. This second adaptation is likewise carried out in uniform steps, which is reflected in the stepped signal curve between t2 and t3.

At point in time t4 the direct-current voltage offset increases in a peak-like manner, and exceeds not only limiting value UT, but in rapid succession also exceeds a predefined maximum limiting value Umax. In the exemplary embodiment described here, maximum limiting value Umax defines a voltage range about the zero line which covers approximately 30% of the voltage range of the demodulated signal. The maximum voltage range may also be selected differently, depending on the type of application and the component characteristics.

This peak-like signal curve is interpreted as an electrostatic collapse of the microphone capacitor, in which the diaphragm and the counter electrode come into physical contact, i.e., are short-circuited, and remain adhered to one another. In this case an electrical reset is initiated in which the microphone capacitor is discharged in order to detach the diaphragm from the counter electrode. For this purpose, for example, a dedicated switch system may be provided. The microphone function is not resumed until after a certain waiting period, at point in time t5. The compensation capacitor is then readjusted in order to once again minimize the direct-current voltage offset and keep it within the predefined tolerance band.

Figure 3:
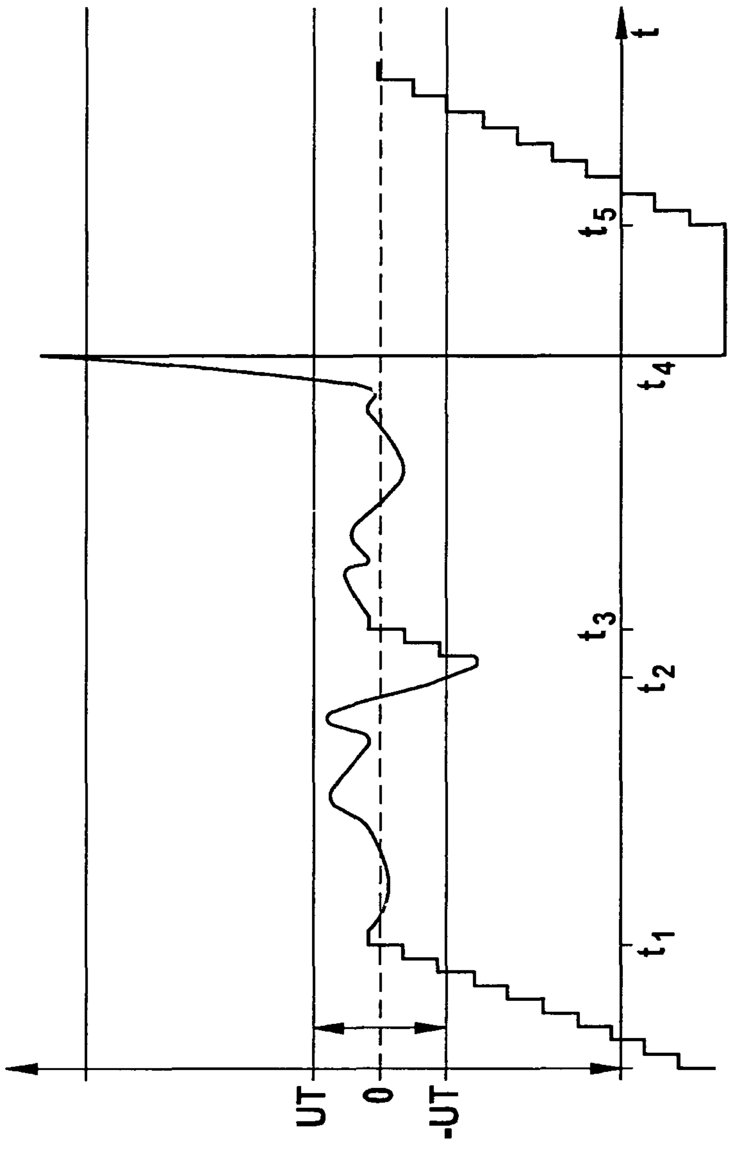
FIG. 3 shows the variation over time of the direct-current voltage offset signal during the initialization of a component according to the present invention and during subsequent operation of the microphone.

Thus, the curve of the direct-current voltage offset signal illustrated in FIG. 3 shows that the compensation capacitor is adjusted once during the start-up phase of the microphone in such a way that the direct-current voltage offset is minimized. During operation of the microphone, the direct-current voltage offset then varies within a predefined tolerance band which indicates normal operation of the microphone. This is monitored continuously, or also only periodically, with the aid of comparators, for example. No corrective measures for influencing the microphone function are taken as long as the direct-current voltage offset varies within the predefined tolerance band. Only in rare cases, for example due to long-term drift phenomena, does the direct-current voltage offset gradually drift from the tolerance band. In that case the compensation capacitor is automatically readjusted in order to once again minimize the direct-current voltage offset and limit same to the predefined tolerance band. In overload situations, which result in a breakdown of the microphone function, the direct-current voltage offset changes abruptly and exceeds a predefined maximum limiting value which is clearly outside the tolerance band. In such cases a reset is carried out in which the microphone capacitor is completely discharged. The operation of the microphone is not resumed until after a certain waiting period, when it is ensured that the diaphragm has detached from the counter electrode of the microphone capacitor. The compensation capacitor is then also adjusted as in the first start-up phase of the microphone in order to minimize the direct-current voltage offset.

Figure 4A:
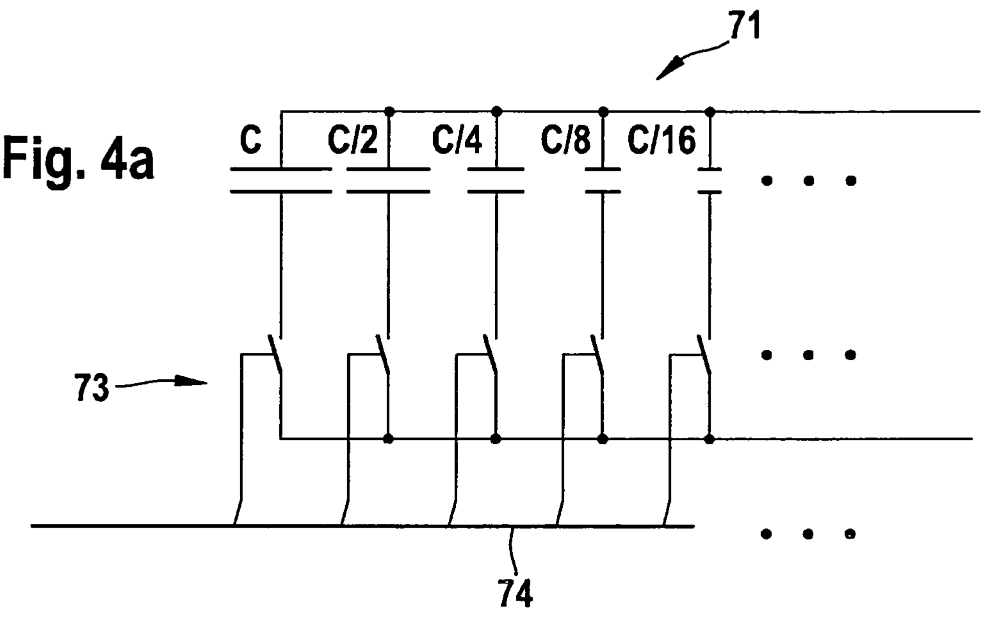
FIG. 4*a, b* in each case show an implementation option for the compensation capacitor of a component according to the present invention.
Figure 4B:
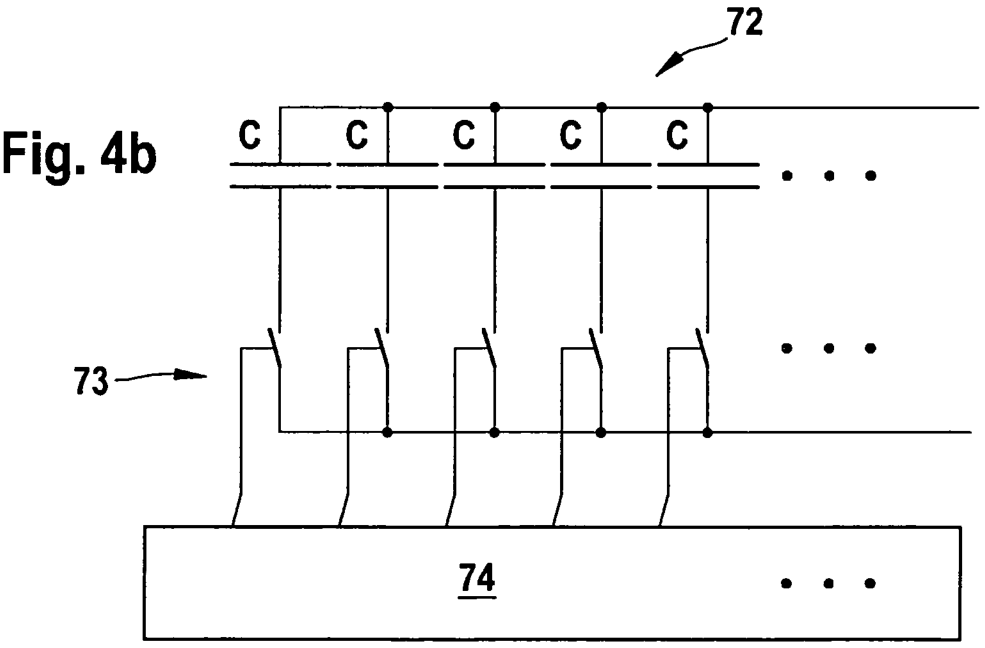

FIGS. 4*a* and 4*b* illustrate two implementation options for an adjustable compensation capacitor. Both cases involve a switchable capacitor bank. Capacitor bank 71 in FIG. 4*a* includes a binary distribution of capacitance values, namely, C, C/2, C/4, . . . , which may also be optionally connected via analog switches 73, while capacitor bank 72 in FIG. 4*b* is composed of a series of identical capacitances which likewise may be optionally connected. In both cases the analog switches are controlled via a binary decoder 74.

As previously mentioned, the compensation capacitor is usually adjusted in steps.

For a linear approximation process as used in FIG. 3, the iteration starts at a predefined capacitance value which corresponds to a given digital counter value of the binary decoder. This may be either the largest possible capacitance or the smallest achievable capacitance of the compensation capacitor system. However, a capacitance value therebetween, for example, which is based on an estimation, may also be selected. Depending on whether the direct-current voltage offset has been increased or decreased due to the adjustment made to the compensation capacitor, the counter value of the binary decoder is incremented by one or decremented by one, resulting in a corresponding increase or decrease, respectively, in capacitance. This procedure is repeated until the direct-current voltage offset is at a minimum or at least varies within the predefined tolerance band. In this case, up to 128 iteration steps are necessary for a 7-bit decoder.

Figure 5:
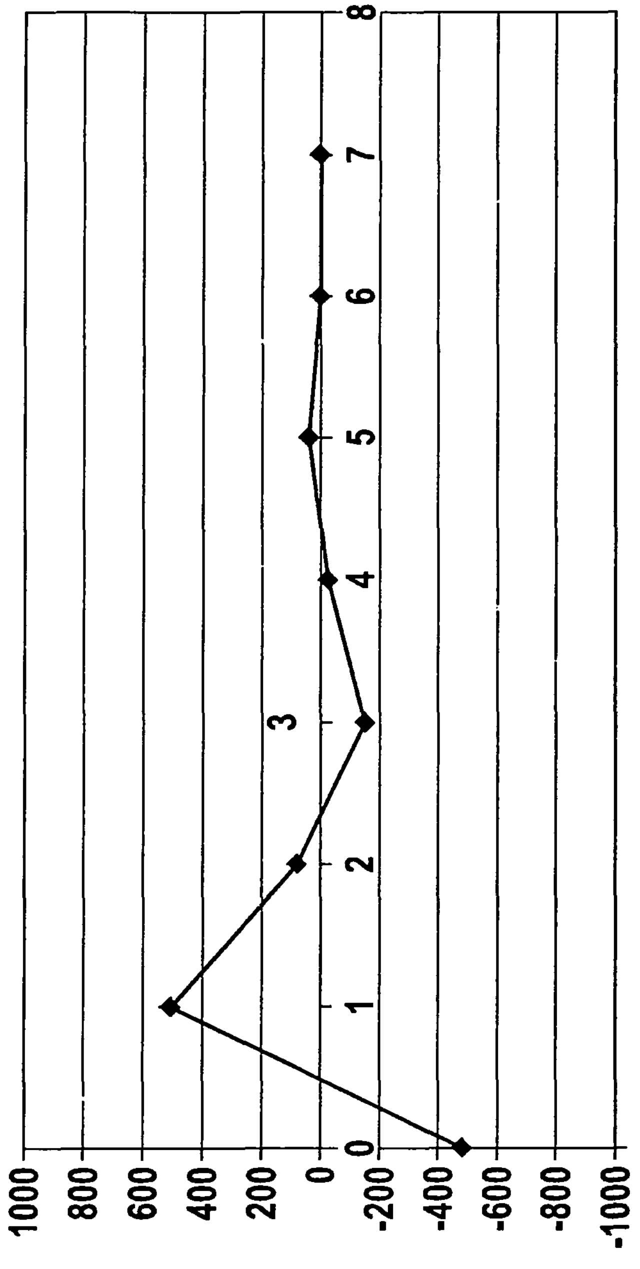
FIG. 5 shows the variation over time of the direct-current voltage offset signal for the case of a binary adaptation of the compensation capacitor.

FIG. 5 illustrates a binary approximation process for adjusting the compensation capacitor. In this case the iteration is carried out bit-by-bit, based on the decoder control word. In the exemplary embodiment described here, at the start of the iteration all bits of the control word are set to zero, which corresponds to the smallest capacitance which is achievable by the compensation capacitor system. This capacitance is then increased by setting the first bit. The direct-current voltage offset is then compared to the zero line in order to determine whether the connected capacitance was too large or not large enough to achieve optimal adaptation. If the capacitance was too large, it is switched off and the corresponding bit is reset to zero. Otherwise, the connected capacitance is maintained. The same procedure is followed with the next bit of the decoder control word. FIG. 5 shows the curve of the direct-current voltage offset for the first seven bits of the decoder control word, which corresponds to seven iteration steps. The algorithm described here is very stable with respect to asymmetries which typically occur for capacitances in integrated circuits. In addition, a binary approximation requires fewer iteration steps than a linear approximation, although a larger capacitance range is covered.

What is claimed is:

1. A component having a micromechanical microphone structure, comprising:

an acoustically active diaphragm which functions as a deflectable electrode of a microphone capacitor, a stationary acoustically permeable counterelement which functions as a counter electrode of the microphone capacitor, a detecting arrangement to detect and evaluate the changes in capacitance of the microphone capacitor;

an applying arrangement to apply a high-frequency clock signal to the microphone capacitor and for applying the inverted clock signal to an adjustable but acoustically inactive compensation capacitor, an integrating operational amplifier which integrates the sum of the current flow through the microphone capacitor and the current flow through the compensation capacitor, a demodulator for the output signal of the integrating operational amplifier, the demodulator being synchronized with the clock signal, and a low-pass filter for obtaining a microphone signal, which corresponds to the changes in capacitance of the microphone capacitor, from the output signal of the demodulator.

2. The component as recited in claim 1, further comprising:

an adapting arrangement to automatically adapt the compensation capacitor to the quiescent capacitance of the microphone capacitor, including an offset filter which is used to ascertain the direct-current voltage component of the demodulator output signal, a monitoring and evaluating arrangement to monitor and evaluate the direct-current voltage component, and a regulation component for regulating the compensation capacitor so that the direct-current voltage component of the demodulator output signal is minimized.

3. The component as recited in claim 2, wherein the upper limiting frequency of the offset filter is considerably less than the lower limiting frequency of the microphone.

4. The component as recited in claim 2, wherein the for monitoring and evaluating arrangement to monitor and evaluate the direct-current voltage component includes at least one window comparator which is used to monitor whether the direct-current voltage component varies within predefined limits.

5. The component as recited in claim 4, wherein the regulation component includes an initiating arrangement to initiate an electrical reset.

6. The component as recited in claim 1, wherein the adjustable compensation capacitor is implemented in the form of a switchable capacitor bank.

7. The component as recited in claim 2, wherein at least one regulatable reference capacitor for noise and interference signal suppression, which is regulated together with the compensation capacitor, is provided upstream from the reference input of the operational amplifier.

8. A method for operating a micromechanical microphone component having an acoustically active diaphragm which functions as a deflectable electrode of a microphone capacitor, and having a stationary acoustically permeable counterelement which functions as a counter electrode of the microphone capacitor, comprising:

applying a high-frequency clock signal to the microphone capacitor, and applying the inverted clock signal to an adjustable but acoustically inactive compensation capacitor;

integrating the sum of the current flow through the microphone capacitor and the current flow through the compensation capacitor with the aid of an integrating operational amplifier; and demodulating the output signal of the integrating operational amplifier with the aid of a demodulator which is synchronized with the clock signal, and obtaining a microphone signal which corresponds to the changes in capacitance of the microphone capacitor by low-pass filtering of the demodulated signal.

9. The method as recited in claim 8, wherein the compensation capacitor is automatically adapted to the quiescent capacitance of the microphone capacitor by ascertaining the direct-current voltage component of the demodulated signal, and regulating the compensation capacitor in such a way that this direct-current voltage component is minimized.

10. The method as recited in claim 9, wherein the compensation capacitor is adapted in steps, linearly, or in a binary search algorithm.

11. The method as recited in claim 9, wherein the compensation capacitor is automatically adapted to the quiescent capacitance of the microphone capacitor during the compensation or the initialization of the microphone component.

12. The method as recited in claim 8, wherein a direct-current voltage component of the demodulated signal is periodically or continuously monitored during operation of the microphone.

13. The method as recited in claim 12, wherein an electrical reset is initiated in which the microphone capacitor is completely discharged when the direct-current voltage component exceeds a predefined maximum limiting value Umax.

14. The method as recited in claim 12, wherein the compensation capacitor is automatically adapted when the direct-current voltage component departs from a tolerance band which is specified by a further limiting value.

15. The method as recited in claim 12, wherein accelerations which act perpendicularly to the diaphragm of the microphone capacitor are detected by evaluating the direct-current voltage component of the demodulated signal.

* * * * *